UNITED STATES PATENT OFFICE.

FANNY R. M. HITCHCOCK, OF BELLVALE, NEW YORK.

FOOD COMPOUND FOR PROMOTING THE RAPID GROWTH OF POULTRY.

1,066,615.  Specification of Letters Patent.  Patented July 8, 1913.

No Drawing.  Application filed May 6, 1909.  Serial No. 494,320.

*To all whom it may concern:*

Be it known that I, FANNY R. M. HITCHCOCK, residing at Bellvale, in the county of Orange and State of New York, have invented a certain new and useful Food Compound for Promoting the Rapid Growth of Poultry, of which the following is a specification.

I have discovered that by feeding to young chickens and ducks a compound composed of vanadium in some form and coca, that the growth of such poultry can be greatly stimulated, and they may be made ready for the market a considerable length of time earlier than under ordinary conditions.

The compound consists of a combination of vanadium in one of its compounded forms, with various constituents present in extract of coca in the proper proportions. The vanadium or its compounds may be used in the dry state, either as powders, fine or coarse, or in solutions, acid, alkaline or neutral, the effect seeming the same in whatever form applied.

As a convenient method of preparing the compound, I prefer the following: To one ounce of fluid extract of coca there is added in dry form eighteen and one-half grains of ammonium meta-vanadate. Upon shaking, a slight precipitate forms and as the meta-vanadate gradually dissolves, the granular precipitate increases in amount. The dilution aids the solution.

If the vanadium is in solid form, such as the powdered metal or a salt or oxid, the precipitate forms relatively slowly in most instances, but in each, the desired combination will be effected. Instead of employing fluid extract of coca, I may proceed by adding alcohol 95 per cent. strong thereto, when a dark precipitate forms, which can be again dissolved in a solution of alcohol and water containing 25 per cent. of alcohol, this dissolved precipitate being employed as above stated, in connection with the metallic vanadium or salt thereof.

In making the compound by any of the methods above stated, the mixture of ingredients should be thoroughly shaken to facilitate combination, and the ultimate product should also be shaken before using. The said ultimate product may be diluted with distilled water containing 25 per cent. of alcohol, to any desired degree, a convenient form being to dilute it to eight times its original bulk.

The dose is from two to thirty drops of such diluted mixture. If desired, the 95 per cent. alcohol can be added to the coca before treating with the vanadium preparation, and the alcohol precipitate can be removed. The granular brown or black precipitate with the vanadium will form as usual, when the coca extract is treated with the preparation of vanadium to be used.

I have found that this compound has remarkable effect in stimulating the skeleton growth in young poultry, and at the same time increasing the amount of food assimilated, and the growth of tissue, the growth being so greatly stimulated that they are rendered fit for the market much sooner than would otherwise be the case.

It will be also understood that this compound would have the same effect when fed to young animals.

Claim:

A compound for stimulating and promoting early growth in poultry, containing fluid extract of coca in combination with a vanadium compound.

In testimony whereof, I have hereunto signed my name, at Warwick, New York this 27th day of April 1909.

FANNY R. M. HITCHCOCK.

Witnesses:
 JOHN W. SANFORD,
 ELEANOR B. GILLESPIE.